(12) United States Patent
Kim et al.

(10) Patent No.: US 11,640,811 B2
(45) Date of Patent: May 2, 2023

(54) THREE SUB-COLOR CORRECTION BASED ON TWO-DIMENSIONAL GRAPHS

(71) Applicant: Google LLC, Mountain View, CA (US)

(72) Inventors: Hyunchul Kim, San Jose, CA (US);
Sang Young Youn, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/207,443

(22) Filed: Mar. 19, 2021

(65) Prior Publication Data

US 2022/0301518 A1  Sep. 22, 2022

(51) Int. Cl.
*G09G 5/06* (2006.01)
*G06T 7/90* (2017.01)
*G06T 7/00* (2017.01)

(52) U.S. Cl.
CPC ............. *G09G 5/06* (2013.01); *G06T 7/0004* (2013.01); *G06T 7/90* (2017.01);
(Continued)

(58) Field of Classification Search
CPC ......... G06T 2207/10024; G06T 11/001; G06T 7/90; G06T 2207/10016; G06T 2207/10004; G06T 13/20; G06T 15/00; G06T 7/0004; G06T 2207/30121; G06T 5/50; G06T 3/4007; G06T 15/08; G09G 5/06; G09G 2320/0242; G09G 2320/0693; G09G 2340/06; G09G 3/2003; G09G 3/3607; G09G 2320/024; G09G 2360/16; G06F 16/5838; H04N 1/60; H04N 9/69; H04N 9/73; H04N 9/735; H04N 1/6027; H04N 9/09; H04N 5/2352; H04N 13/257;
(Continued)

(56) References Cited

U.S. PATENT DOCUMENTS 7,034,852 B2 * 4/2006 Matsuda ............. H04N 9/3194
345/589
7,599,552 B2 * 10/2009 Yamazoe ............. H04N 1/6005
382/167
(Continued)

OTHER PUBLICATIONS

International Search Report and Written Opinion in International Appln. No. PCT/US2022/015297, dated May 3, 2022, 25 pages.

*Primary Examiner* — Duc Q Dinh
(74) *Attorney, Agent, or Firm* — Fish & Richardson P.C.

(57) ABSTRACT

Methods, systems, and apparatus, including computer programs encoded on a computer storage medium, for three sub-color correction based on two-dimensional graphs. In an aspect, a method includes obtaining an image to be shown on a display, determining three sub-color values of a particular pixel in the image, including a first sub-color value for a first sub-color, a second sub-color value for a second sub-color, and a third sub-color value for a third sub-color of the particular pixel, obtaining a representation of a two-dimensional graph of color-correction curves, selecting a selected color-correction curve to use to correct the first sub-color value based on both the second sub-color value and the third sub-color value, determining a corrected first sub-color value based on the first sub-color value, and outputting the image using the corrected first sub-color value instead of the first sub-color value.

18 Claims, 7 Drawing Sheets

(52) U.S. Cl.
CPC .............. *G06T 2207/30121* (2013.01); *G09G 2320/0242* (2013.01); *G09G 2320/0693* (2013.01)

(58) Field of Classification Search
CPC .. H04N 1/6077; H04N 1/6075; H04N 1/6025; H04N 5/369; H04N 9/3182; H04N 9/3194; H04N 1/00031; H04N 1/00068; H04N 1/6013; H04N 1/54; H04N 13/239; H04N 13/275
See application file for complete search history.

(56) References Cited

U.S. PATENT DOCUMENTS

| | | | |
|---|---|---|---|
| 7,719,715 B2* | 5/2010 | Moriya ................ | H04N 1/6033 358/2.1 |
| 9,007,391 B2* | 4/2015 | Ritts ..................... | G09G 5/026 345/589 |
| 2002/0067848 A1* | 6/2002 | Queiroz ................. | G06K 9/00 348/E9.053 |
| 2004/0257595 A1 | 12/2004 | Sharma et al. | |
| 2005/0190205 A1* | 9/2005 | Koyama .............. | G09G 3/3611 345/690 |
| 2007/0091114 A1* | 4/2007 | Kwak ................... | G09G 3/3611 348/E17.005 |
| 2013/0050504 A1* | 2/2013 | Safaee-Rad .......... | G09G 3/2003 348/181 |
| 2017/0061926 A1* | 3/2017 | Bhattacharjee ........... | G06T 1/60 |
| 2018/0255206 A1* | 9/2018 | Kim ......................... | H04N 1/60 |

\* cited by examiner

THREE SUB-COLOR CORRECTION BASED ON TWO-DIMENSIONAL GRAPHS

BACKGROUND

Color correction may be performed when showing an image on a display. For example, values of pixels in the image may be color corrected and the color corrected values may then be used to display the image. Color correction may be used so that an image is accurately shown. For example, color correction may account for variations in performance of different displays due to differences in physical structures of pixels across displays.

SUMMARY

This specification describes techniques, methods, systems, and other mechanisms for three sub-color correction based on two-dimensional graphs. Color lookup tables may be used so that images are accurately displayed on the displays. For example, a color lookup table may correct a red, green, and blue (RGB) value of (60, 60, 60) for a pixel in an image to (58, 63, 59) so that the display accurately shows that pixel of the image, where red is a first sub-color, green is a second sub-color, and blue is a third sub-color.

Color lookup tables may be unique to each display. A first display may have a color lookup table with output values that are different than a second display due to differences in how pixels in each display respond to driving current. For example, a color lookup table for a first display may remap (60, 60, and 60) to (58, 63, and 59) and a color lookup table for a second display may remap (60, 60, and 60) to (61, 59, and 60).

A color lookup table for a display that has RGB values that each range from 0 to 255 may store 255×255×255 RGB values, where each of the RGB values represent corrected RGB values for an original RGB value. However, this size may be impractical due to storage capacity. In some implementations, a color lookup table for a display may store 17×17×17 RGB values, and interpolation may be used to color correct values in between stored values. For example, a corrected RGB value for (8, 8, 8) may be determined from the average between corrected RGB values of (0, 0, 0) and (14, 14, 14). However, interpolation may also be computationally expensive process, require additional circuitry, and/or require power for processing.

Interpolation may be avoided by compressing a color lookup table and then storing the compressed color lookup table for later use in color correction. A three-dimensional color lookup table may be compressed based on converting each of the three sub-colors into a respective two-dimensional graph of color correction curves, where the two-dimensional graphs are then compressed. For example, a RGB color lookup table may be converted into respective first, second, and third two-dimensional graph of curves for the red sub-color, green sub-color, and blue sub-color. Each of the two-dimensional graph of curves may be compressed using various techniques, for example, using Discrete Cosine Transform, Fourier Transform, Compressive Sensing, or Principal Component Analysis.

The compressed color lookup table may later be used to show an image on a display. For example, when correcting a red sub-color value for a particular pixel, the two-dimensional graph for the red sub-color may be decompressed, a color correction curve selected based on the blue sub-color and green sub-color for the particular pixel, and then a corrected red sub-color determined from the selected color correction curve.

In general, one innovative aspect of the subject matter described in this specification can be embodied in a method that include the actions of obtaining an image to be shown on a display, determining three sub-color values of a particular pixel in the image, including a first sub-color value for a first sub-color, a second sub-color value for a second sub-color, and a third sub-color value for a third sub-color of the particular pixel, obtaining a representation of a two-dimensional graph of color-correction curves, where each respective color-correction curve of the color-correction curves in the two-dimensional graph: provides multiple corrected first sub-color values for multiple respective original first sub-color values, and corresponds to a combination of an original second sub-color value and an original third sub-color that is unique to the respective color-correction curve and different from other color-correction curves in the two-dimensional graph, selecting a selected color-correction curve, from among the color-correction curves in the two-dimensional graph of color-correction curves, to use to correct the first sub-color value for the particular pixel in the image, based on both the second sub-color value for the particular pixel in the image and the third sub-color value for the particular pixel in the image, determining a corrected first sub-color value for the particular pixel, from among the multiple corrected first sub-color values provided by the selected color-correction curve, based on the first sub-color value for the particular pixel, and outputting the image using the corrected first sub-color value for the particular pixel instead of the first sub-color value.

Other embodiments of this aspect include corresponding circuitry, computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. In some aspects, determining a corrected first sub-color value for the particular pixel, from among the multiple corrected first sub-color values provided by the selected curve, based on the first sub-color value for the particular pixel includes selecting a selected position along the color-correction curve that was selected based on the first sub-color value for the particular pixel and identifying the corrected first sub-color value for the particular pixel based on the selected position, the corrected first sub-color value being different than the first sub-color value.

In some aspects, determining three sub-color values of a particular pixel in the image includes determining red, green, and blue sub-colors. In some implementations, the representation of the two-dimensional graph of color-correction curves is generated from a three-dimensional graph, where three axes of the three-dimensional graph correspond to the three sub-colors. In certain aspects, the three-dimensional graph is generated from multiple images of the display captured by a camera during a calibration process.

In some aspects, obtaining a representation of a two-dimensional graph of color-correction curves includes retrieving a compressed copy of the representation of the two-dimensional graph of color-correction curves from storage and decompressing the compressed copy of the representation of the two-dimensional graph of color-correction curves. In some implementations, actions include obtaining a representation of a second two-dimensional graph of second color-correction curves, where each respective color-correction curve of the second color-correction curves in the second two-dimensional graph: provides multiple corrected second sub-color values for multiple respective original second sub-color values, and corresponds to a combination of an original second sub-color value and an original third sub-color value that is unique to the respective second color-correction curve and different from other second color-correction curves in the second two-dimensional graph.

In certain aspects, actions include obtaining a representation of a third two-dimensional graph of third color-correction curves, where each respective color-correction curve of the third color-correction curves in the third two-dimensional graph: provides multiple corrected third sub-color values for multiple respective original third sub-color values, and corresponds to a combination of an original second sub-color value and an original third sub-color value that is unique to the respective third color-correction curve and different from other third color-correction curves in the third two-dimensional graph.

As additional description to the embodiments described below, the present disclosure describes the following embodiments.

Embodiment 1 is method for three sub-color correction based on two-dimensional graphs, the method comprising: obtaining an image to be shown on a display; determining three sub-color values of a particular pixel in the image, including a first sub-color value for a first sub-color, a second sub-color value for a second sub-color, and a third sub-color value for a third sub-color of the particular pixel; obtaining a representation of a two-dimensional graph of color-correction curves, wherein each respective color-correction curve of the color-correction curves in the two-dimensional graph: provides multiple corrected first sub-color values for multiple respective original first sub-color values, and corresponds to a combination of an original second sub-color value and an original third sub-color that is unique to the respective color-correction curve and different from other color-correction curves in the two-dimensional graph; selecting a selected color-correction curve, from among the color-correction curves in the two-dimensional graph of color-correction curves, to use to correct the first sub-color value for the particular pixel in the image, based on both the second sub-color value for the particular pixel in the image and the third sub-color value for the particular pixel in the image; determining a corrected first sub-color value for the particular pixel, from among the multiple corrected first sub-color values provided by the selected color-correction curve, based on the first sub-color value for the particular pixel; and outputting the image using the corrected first sub-color value for the particular pixel instead of the first sub-color value.

Embodiment 2 is the method of embodiment 1, wherein determining a corrected first sub-color value for the particular pixel, from among the multiple corrected first sub-color values provided by the selected curve, based on the first sub-color value for the particular pixel comprises: selecting a selected position along the color-correction curve that was selected based on the first sub-color value for the particular pixel; and identifying the corrected first sub-color value for the particular pixel based on the selected position, the corrected first sub-color value being different than the first sub-color value.

Embodiment 3 is the method of any one of embodiments 1 through 2, wherein determining three sub-color values of a particular pixel in the image comprises: determining red, green, and blue sub-colors.

Embodiment 4 is the method of any one of embodiments 1 through 3, wherein the representation of the two-dimensional graph of color-correction curves is generated from a three-dimensional graph, where three axes of the three-dimensional graph correspond to the three sub-colors.

Embodiment 5 is the method of embodiment 4, wherein the three-dimensional graph is generated from multiple images of the display captured by a camera during a calibration process.

Embodiment 6 is the method of any one of embodiments 1 through 5, wherein obtaining a representation of a two-dimensional graph of color-correction curves comprises: retrieving a compressed copy of the representation of the two-dimensional graph of color-correction curves from storage; and decompressing the compressed copy of the representation of the two-dimensional graph of color-correction curves.

Embodiment 7 is the method of any one of embodiments 1 through 6, comprising: obtaining a representation of a second two-dimensional graph of second color-correction curves, wherein each respective color-correction curve of the second color-correction curves in the second two-dimensional graph: provides multiple corrected second sub-color values for multiple respective original second sub-color values, and corresponds to a combination of an original second sub-color value and an original third sub-color value that is unique to the respective second color-correction curve and different from other second color-correction curves in the second two-dimensional graph.

Embodiment 8 is the method of any one of embodiments 1 through 7, comprising: obtaining a representation of a third two-dimensional graph of third color-correction curves, wherein each respective color-correction curve of the third color-correction curves in the third two-dimensional graph: provides multiple corrected third sub-color values for multiple respective original third sub-color values, and corresponds to a combination of an original second sub-color value and an original third sub-color value that is unique to the respective third color-correction curve and different from other third color-correction curves in the third two-dimensional graph.

Embodiment 9 is directed to one or more computer-readable devices having instructions stored thereon, that when executed by one or more processors, cause the performance of actions according to the method of any one of embodiments 1 through 8.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
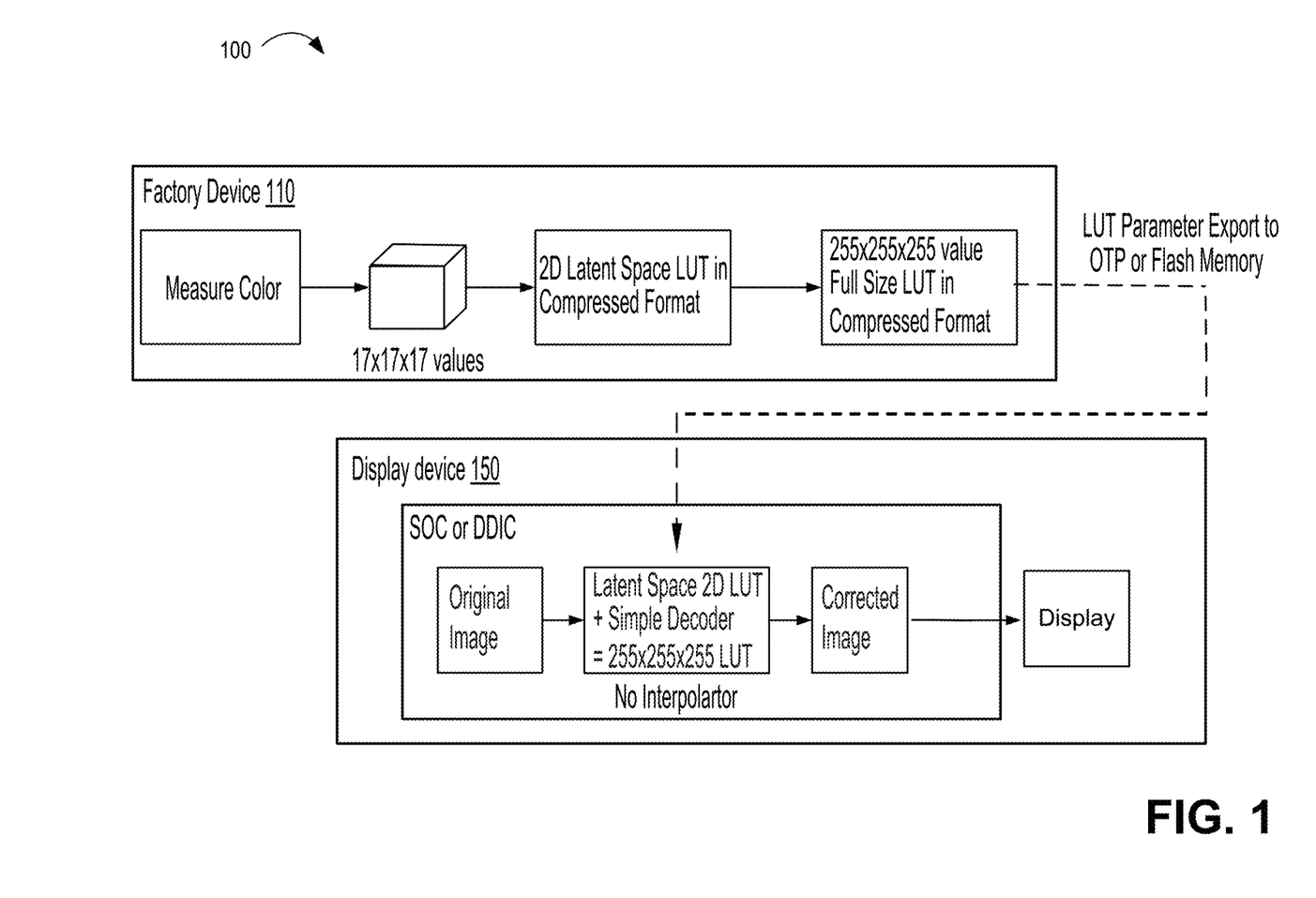
FIG. 1 is a block diagram of an example system that performs three sub-color correction based on two-dimensional graphs.

FIG. 1 is a block diagram of an example system 100 that performs three sub-color correction based on two-dimensional graphs. The system 100 shows how images captured by a camera of a display of a display device 150 may be used to measure how the display shows various RGB colors. For example, seventeen images of the display may be captured by a factory device 110 during a calibration process at a factory that manufactures the display device 150 that includes the display, where each image captures what the display shows for a different RGB value for pixels.

The images may be used to generate a three-dimensional lookup table for color correction. For example, the factory device 110 at the factory may receive the images and generate a three-dimensional lookup table with seventeen values for each sub-color. The three-dimensional lookup table may then be represented by two-dimensional graphs of color-correction curves, and the two-dimensional graphs may then be compressed. For example, the factory device 110 at the factory may generate three separate two-dimensional graphs of color-correction curves from the three-dimensional lookup table, and each of the two-dimensional graphs of color-correction curves may then be independently compressed.

The compressed two-dimensional graphs of color-correction curves may then be expanded into a full size lookup table. For example, the two-dimensional graphs that represent a 17×17×17 value lookup table may be expanded into a 255×255×255 value lookup table. In another example, for a two-dimensional graph that includes a curve for sub-color values for every fifteenth value, the factory device 110 may generate thirteen additional curves between two existing curves, where each of the thirteen additional curves represent a different sub-color value between the two existing curves. Expansion may be performed based on an interpolation process that is performed by the factory device 110.

The compressed expanded two-dimensional graphs may then be stored on the display device 150 that includes the display. For example, the factory device 110 at the factory may transmit a representation of the compressed expanded two-dimensional graphs to the display device 150 for storage in a Display Driver Integrated Circuit (DDIC) or System on Chip (SOC).

Later when the display device 150 is to show an image, the DDIC or SOC of the display device 150 may obtain the image, determine original RGB values from the image, and use the compressed expanded two-dimensional graphs to correct the original RGB values to corrected RGB values. As shown, as the compressed expanded two-dimensional graphs may represent a full size of 255×255×255 values, the DDIC or SOC may not need an interpolator to correct for values.

Figure 2:
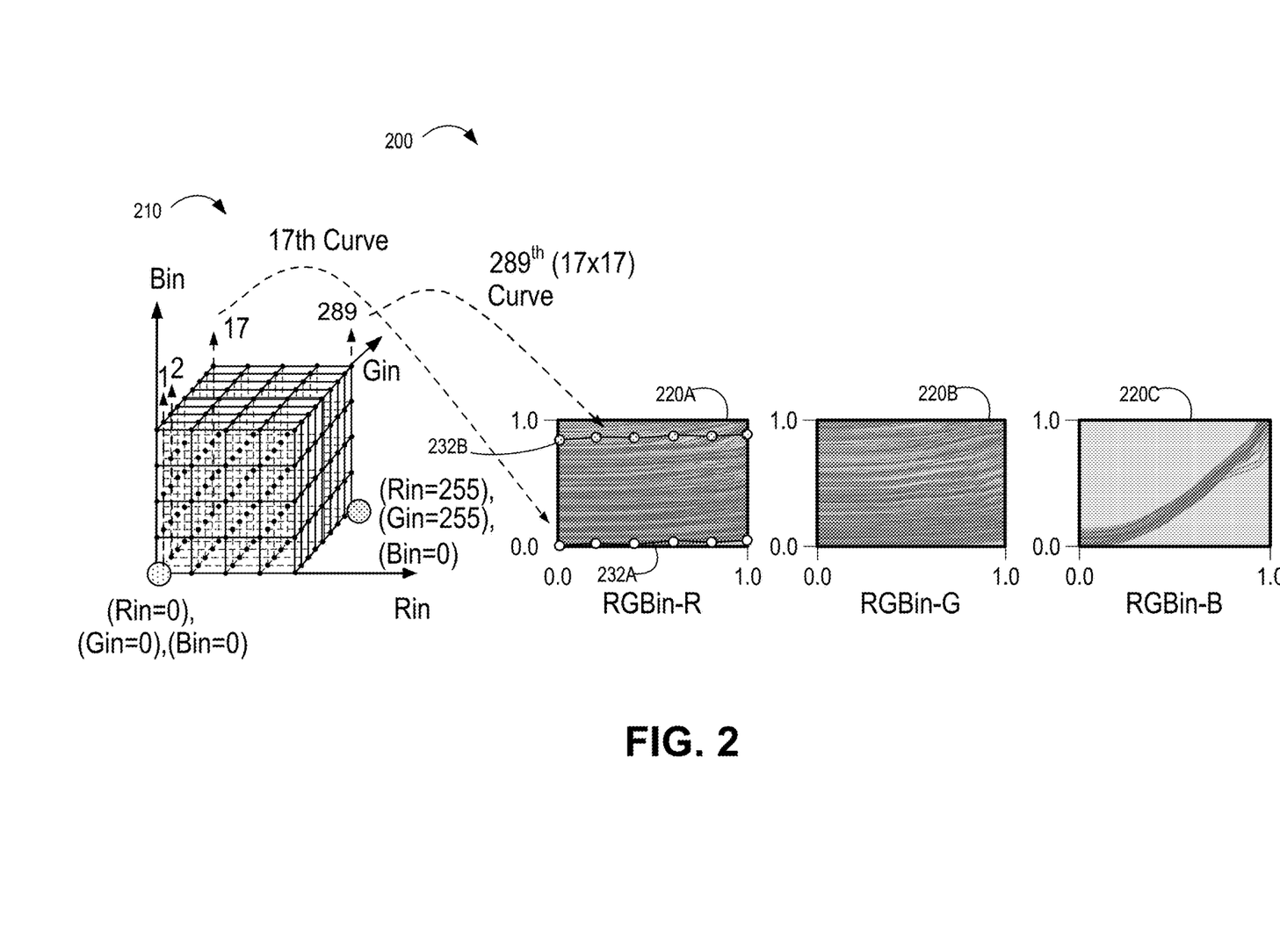
FIG. 2 is an illustration of a three-dimensional graph represented by three two-dimensional graphs of slices.

FIG. 2 is an illustration 200 of a three-dimensional graph 210 represented by three two-dimensional graphs 220A-C of slices. The three-dimensional graph 210 represents a red (R) sub-color along the x-axis, a blue (B) sub-color along the y-axis, and a green (G) sub-color along the z-axis, where slicing is performed along the y-axis representing blue. The three-dimensional graph 210 may represent a 17×17×17 value lookup table. For example, the three-dimensional graph 210 may represent seventeen red sub-colors, seventeen green sub-colors, and seventeen blue sub-colors.

Points in the three-dimensional graph 210 may correspond to an input RGB value and values of the points may correspond to corrected RGB values. For example, a point at (15, 15, 15) with a value of (14, 16, 13) may indicate that a RGB value of (15, 15, 15) corrects to a RGB value of (14, 16, 13). In another example, a point at (30, 30, 30) with a value of (31, 30, 29) may indicate that a RGB value of (30, 30, 30) corrects to a RGB value of (31, 30, 29).

The three-dimensional graph 210 may be represented by three two-dimensional graphs. For example, the three-dimensional graph 210 may be represented by a red sub-color graph 220A, a blue sub-color graph 220B, and a green sub-color graphs 220C. The values along the x-axis and y-axis of the two dimensional graphs may represent normalized values between a minimum and maximum. For example, 0.0 may correspond with a sub-color value of zero and 1.0 may correspond to a sub-color value of two hundred fifty five.

Each of the two-dimensional graphs may include multiple color correction curves. For example, the red sub-color two dimensional graph 220A may include 17×17 curves. Each of the multiple color correction curves may provide multiple corrected first sub-color values for multiple respective original first sub-color values, and correspond to a combination of an original second sub-color value and an original third sub-color that is unique to the respective color-correction curve and different from other color-correction curves in the two-dimensional graph.

For example, the color correction curve 232A may show seventeen original blue sub-color values along the x-axis and corrected red sub-color values along the y-axis, and may correspond to an original green sub-color value of zero and an original red sub-color value of zero. In another example, the color correction curve 232B may show seventeen original blue sub-color values along the x-axis and corrected red sub-color values along the y-axis, and may correspond to an original green sub-color value of two hundred fifty five and an original red sub-color value of two hundred fifty five.

In yet another example, the color correction curves in the blue sub-color two-dimensional graph 220C may show seventeen original blue sub-color values along the x-axis and corrected blue sub-color values along the y-axis for various combinations of original red sub-color values and original green sub-color values. In still another example, the color correction curves in the green sub-color two-dimensional graph 220B may show seventeen original blue sub-color values along the x-axis and corrected green sub-color values along the y-axis for various combinations of original red sub-color values and original green sub-color values.

The color corrections curves of the two dimensional graphs may represent slices of the three dimensional graph along a particular axis. For example, the color correction curves shown in FIG. 1 may represent slices along the y-axis that start at zero along the y-axis and go up to two hundred fifty five on the y-axis, and there are two hundred eighty nine curves, each for a different one of the two hundred eighty nine points with a y-axis value of zero.

Figure 3:
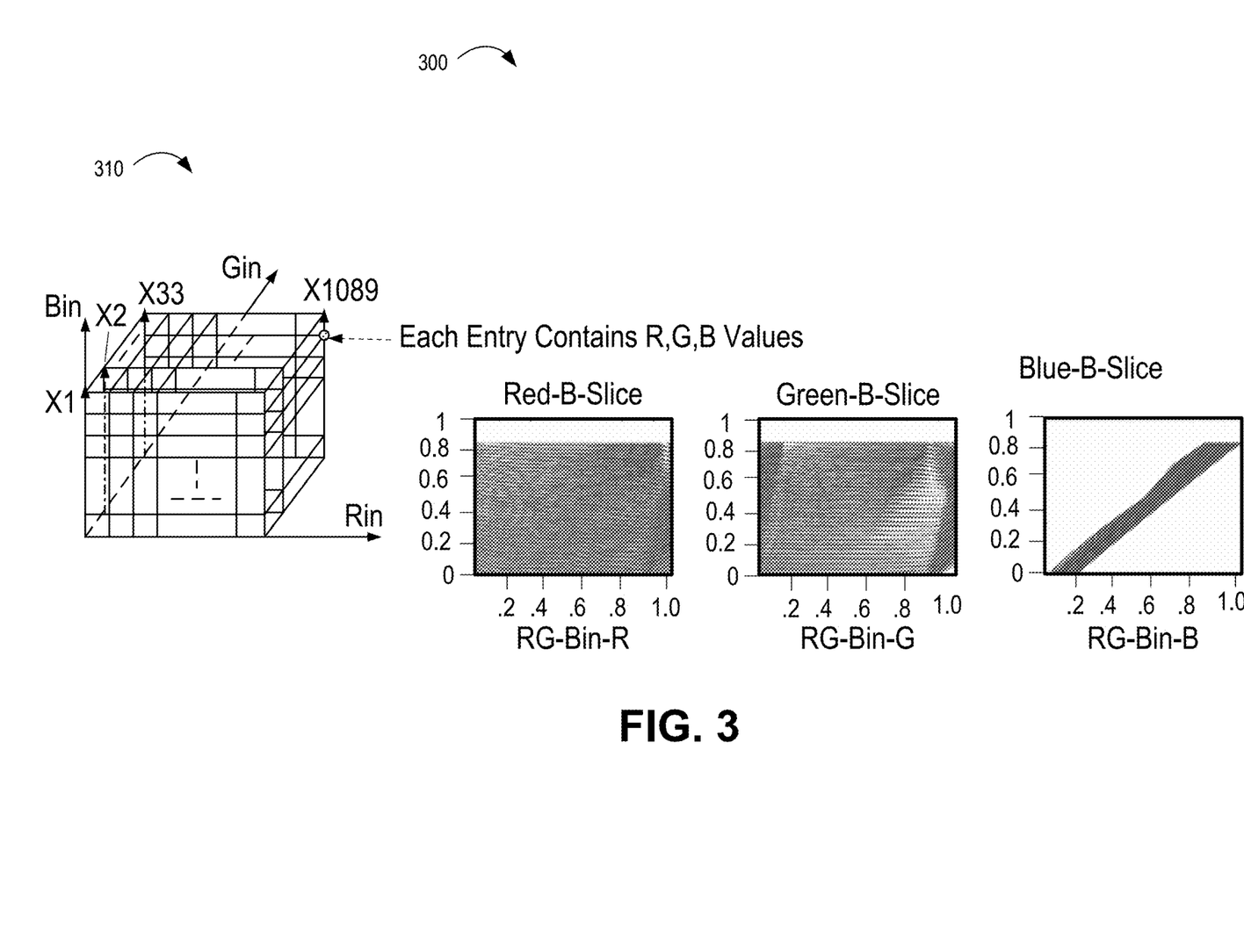
FIG. 3 is an illustration of a three-dimensional graph represented by three two-dimensional graphs of slices in a blue sub-color direction.

FIG. 3 is an illustration 300 of a three-dimensional graph 310 represented by three two-dimensional graphs of slices in a blue sub-color direction. The three-dimensional graph 310 may represent thirty three different values for each of the three sub-colors, so may include one thousand eighty nine color correction curves per two-dimensional graph where each of the curves shows thirty three values along the x-axis. As illustration 300 shows slices in the blue sub-color direction which is along the y-axis, the blue sub-color two dimensional graph shows that the value of the corrected blue sub-color steadily increases as the original blue sub-color value increases.

Figure 4:
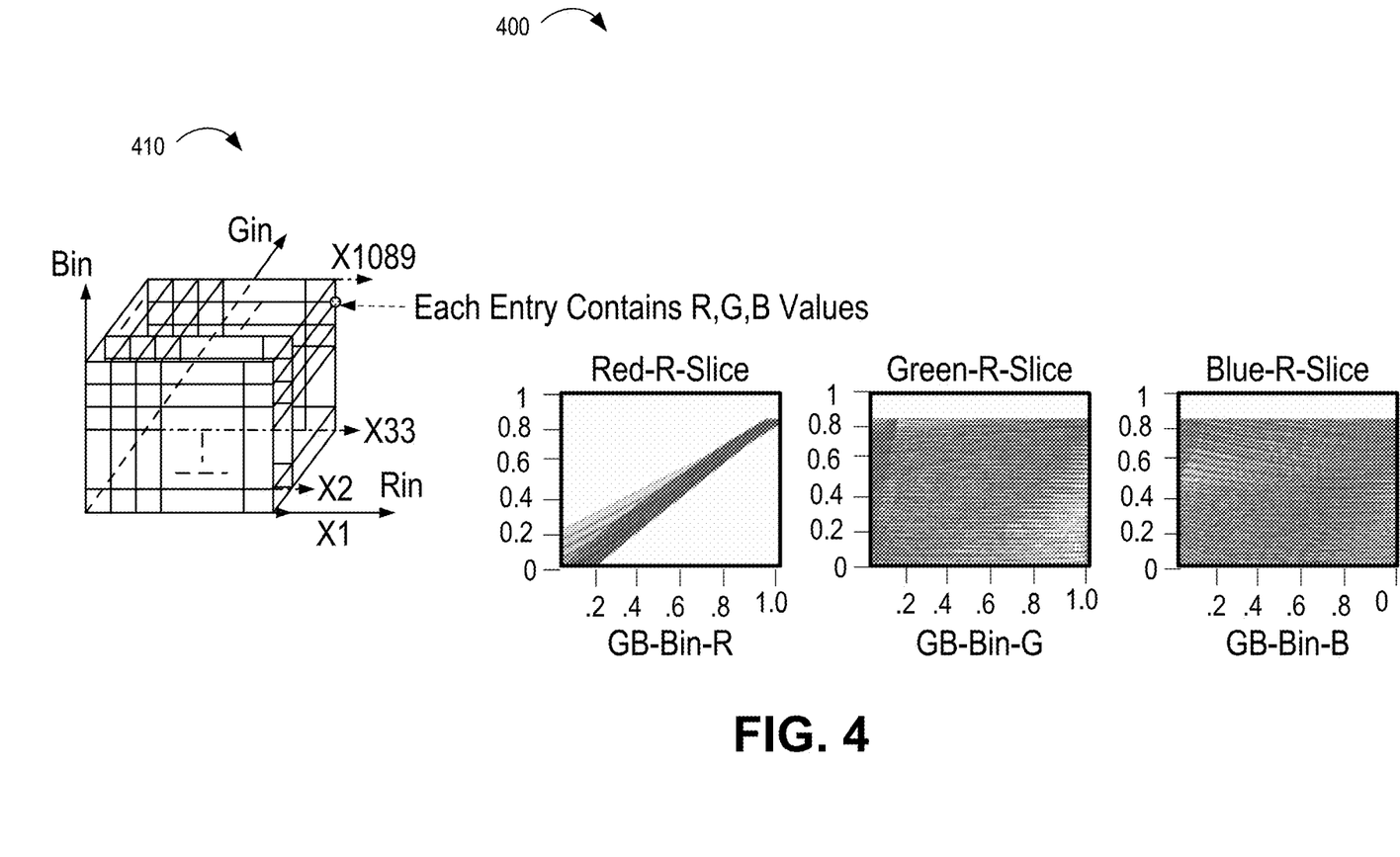
FIG. 4 is an illustration of a three-dimensional graph represented by three two-dimensional graphs of slices in a red sub-color direction.

FIG. 4 is an illustration 400 of a three-dimensional graph 410 represented by three two-dimensional graphs of slices in a red sub-color direction. The three-dimensional graph 410 may represent thirty three different values for each of the three sub-colors, so may include one thousand eighty nine color correction curves per two-dimensional graph where each of the curves shows thirty three values along the x-axis. As illustration 400 shows slices in the red sub-color direction which is along the x-axis, the red sub-color two dimensional graph shows that the value of the corrected red sub-color steadily increases as the original red sub-color value increases.

Figure 5:
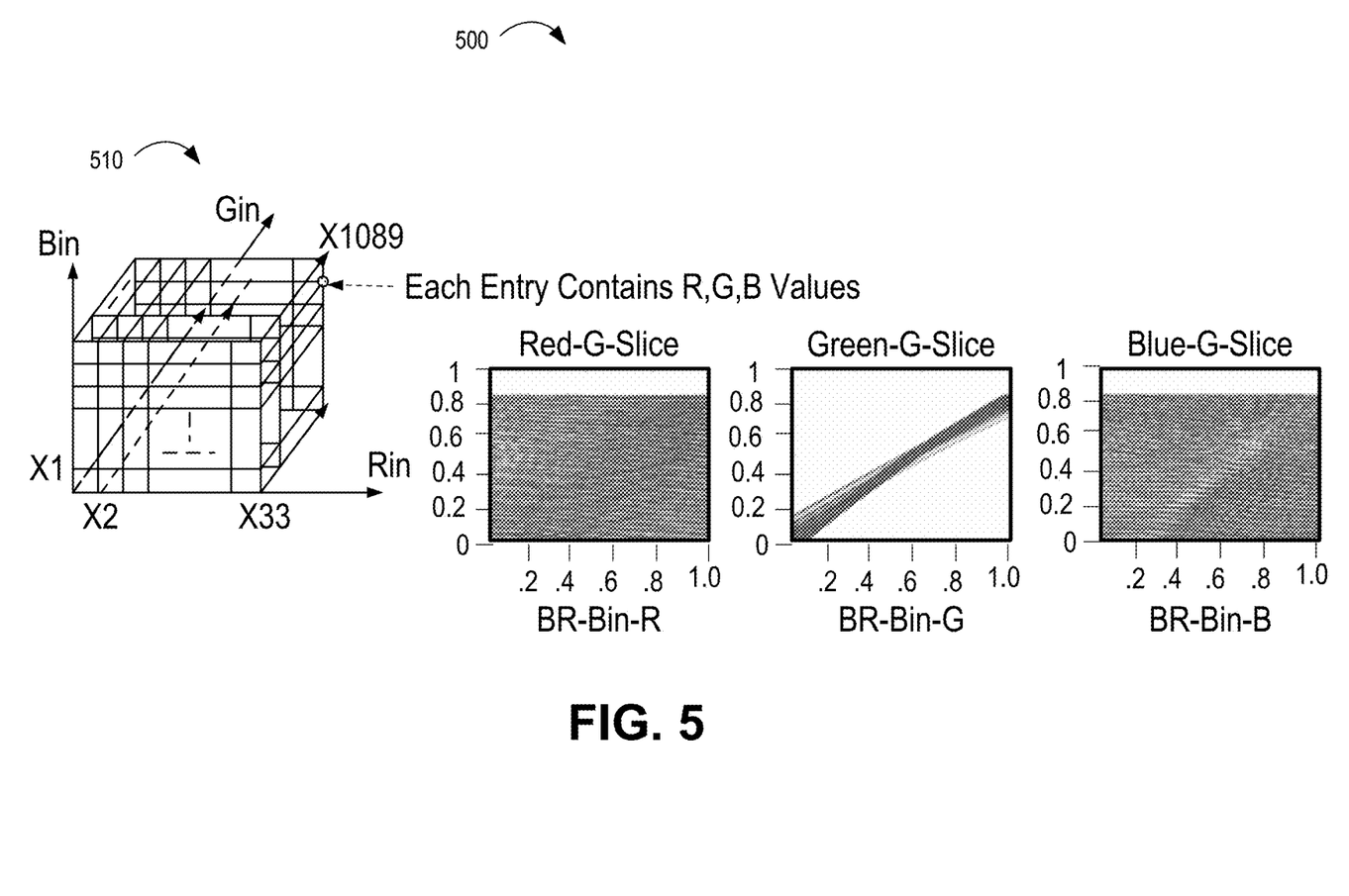
FIG. 5 is an illustration of a three-dimensional graph represented by three two-dimensional graphs of slices in a green sub-color direction.

FIG. 5 is an illustration 500 of a three-dimensional graph 510 represented by three two-dimensional graphs of slices in a green sub-color direction. The three-dimensional graph 510 may represent thirty three different values for each of the three sub-colors, so may include one thousand eighty nine color correction curves per two-dimensional graph where each of the curves shows thirty three values along the x-axis. As illustration 500 shows slices in the green sub-color direction which is along the x-axis, the green sub-color two dimensional graph shows that the value of the corrected green sub-color steadily increases as the original green sub-color value increases.

Figure 6:
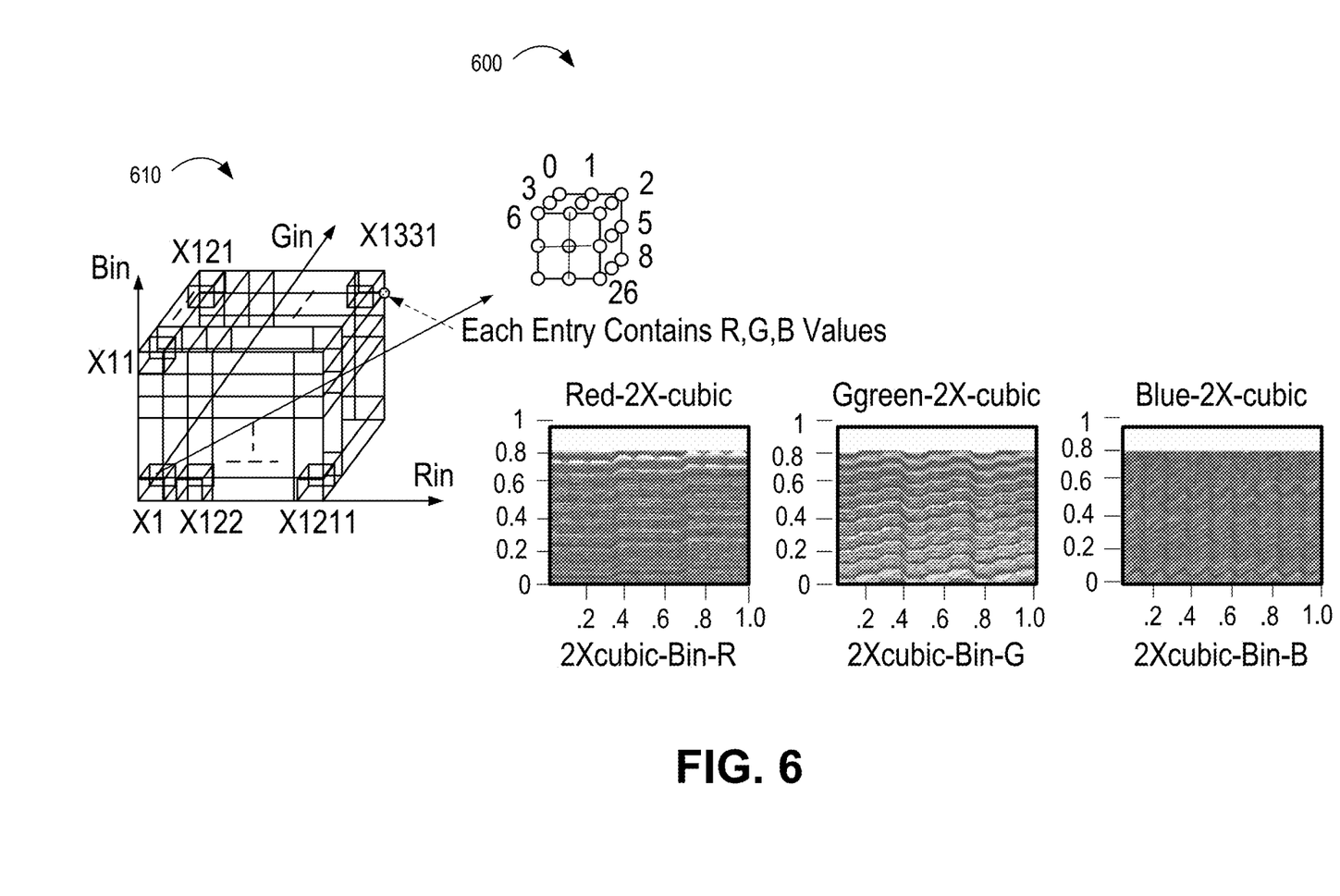
FIG. 6 is an illustration of a three-dimensional graph represented by three two-dimensional graphs of cubes.

FIG. 6 is an illustration 600 of a three-dimensional graph 610 represented by three two-dimensional graphs of multiple color correct curves. The three-dimensional graph 610 may be represented by one thousand three hundred thirty one cubes that are each 3×3×3 size, where the cubes do not overlap. Each of the cubes may represent a respective color correction curve in the two-dimensional graphs, and each of the points within the cube may correspond to respective points along the curve.

For example, a first curve in a red sub-color two dimensional graph may correspond to red sub-color values of points within a cube labeled X1 and a second curve in the red sub-color two dimensional graph may correspond to red sub-color values of points within a cube labeled X2. As shown in FIG. 6, the cube labeled X1 includes twenty seven points that fall within a cube with opposing corners at positions (0,0,0) to (2, 2, 2). In another example, the cube labeled X2 in FIG. 6 may include twenty seven points that fall within a cube with opposing corners at positions (3,0,0) to (5, 2, 2).

The positions within the cube that are used for the x-axis may be uniform for all the cubes. For example, the positions within the cube may start with numbering zero for the corner with the greatest z-axis value, greatest y-axis value, and least x-axis value and increment as the x-axis increases, then continue from the second greatest z-axis value, greatest y-axis value, and least x-axis value and increment as the x-axis increases, repeating until the z-axis is zero, then continue from the next greatest y-axis value repeating until the y-axis value is zero. Alternate ways of numbering the positions with the cube may also be used. For example, the numbering of positions may be reversed or in some other order.

While the cubes shown in FIG. 6 are 3×3×3 in size, other size cubes may be used. For example, cubes used to represent curves may be 2×2×2, 5×5×5, or some other size where the maximum value along the x-axis changes based on the number of points within the cubes.

Figure 7:
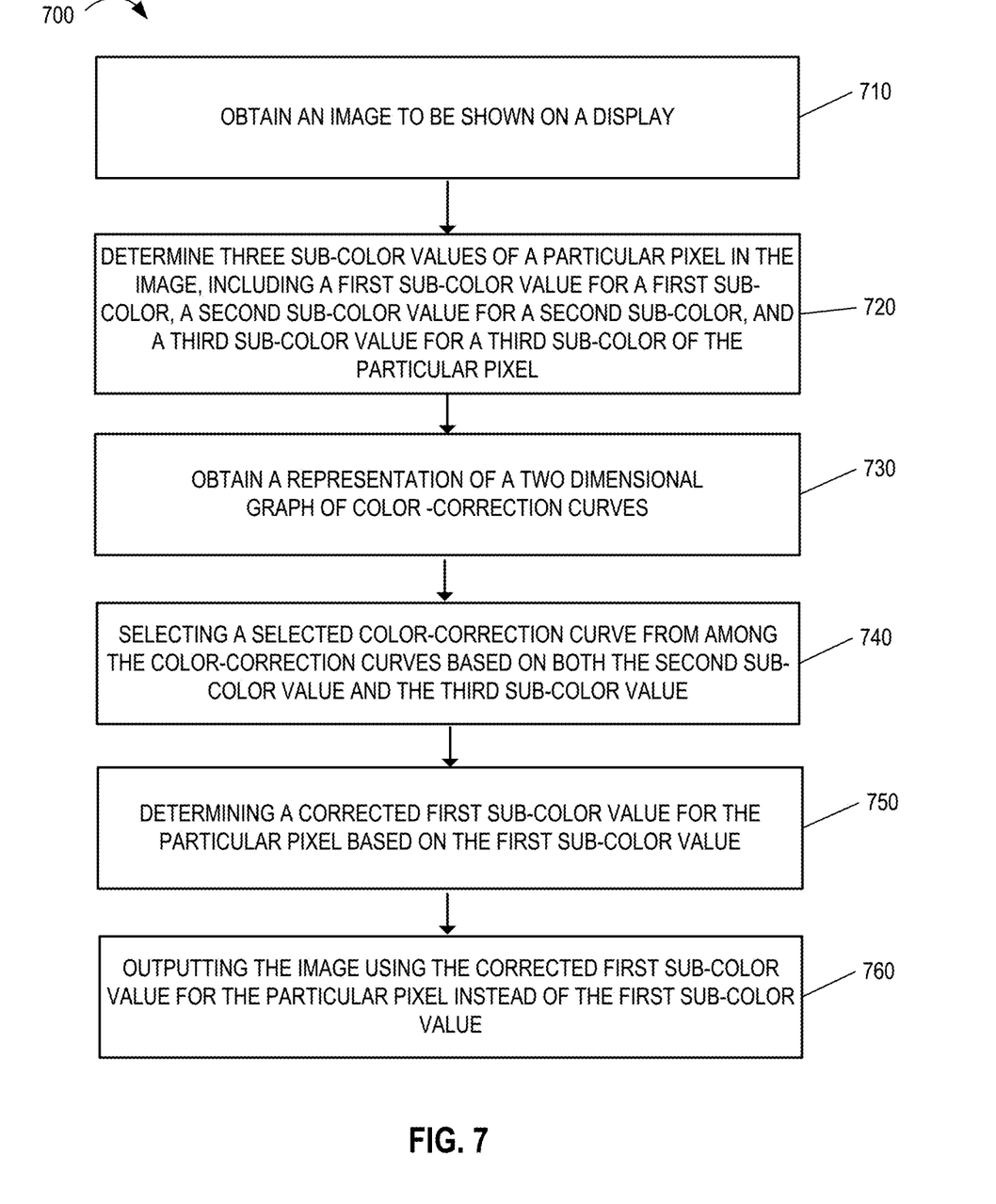
FIG. 7 is a flowchart that shows a process for three sub-color correction based on two-dimensional graphs.

FIG. 7 is a flowchart that shows a process 700 for three sub-color correction based on two-dimensional graphs. The process 700 may be performed by a SOC or DDIC in a device that includes as panel. For example, the process 700 may be performed by the SOC or DDIC of display device 150 of FIG. 1.

Briefly, and described in more detail below, the process 700 includes obtaining an image to be shown on a display (710), determining three sub-color values of a particular pixel in the image, including a first sub-color value for a first sub-color, a second sub-color value for a second sub-color, and a third sub-color value for a third sub-color of the particular pixel (720), obtaining a representation of a two dimensional graph of color-correction curves (730), selecting a selected color-correction curve from among the color-correction curves based on both the second sub-color value and the third sub-color value (740), determining a corrected first sub-color value for the particular pixel based on the first sub-color value (750), and outputting the image using the corrected first sub-color value for the particular pixel instead of the first sub-color value (760).

The process 700 includes obtaining an image to be shown on a display (710). For example, the SOC or DDIC of the display device 150 may receive an original image to show on a display of the display device 150. The image may include pixel values for different coordinates in the image. For example, the image may be a one hundred by one hundred pixel size image, where the image stores a respective RGB value for each of the ten thousand pixels in the image.

The process 700 includes determining three sub-color values of a particular pixel in the image, including a first sub-color value for a first sub-color, a second sub-color value for a second sub-color, and a third sub-color value for a third sub-color of the particular pixel (720). For example, the SOC or DDIC of the display device 150 may determine a pixel at coordinates (0,0) in the image has a RGB value of (30, 45, 60).

In some implementations, determining three sub-color values of a particular pixel in the image includes determining red, green, and blue sub-colors. For example, the SOC or DDIC of the display device 150 may determine that the pixel at coordinates (0,0) has a red sub-color value of 30, a green sub-color value of 45, and a blue sub-color value of 60.

The process 700 includes obtaining a representation of a two dimensional graph of color-correction curves (730). For example, the SOC or DDIC of the display device 150 may obtain a representation of a two-dimensional graph of color-correction curves for the blue sub-color.

In some implementations, the representation of the two-dimensional graph of color-correction curves is generated from a three-dimensional graph, where three axes of the three-dimensional graph correspond to the three sub-colors. For example, the representation of a two-dimensional graph of color-correction curves is generated by the factory device 110 from a three-dimensional graph of color corrections for RGB values.

In some implementations, the three-dimensional graph is generated from multiple images of the display captured by a camera during a calibration process. For example, the three-dimensional graph may be generated by the factory device 110 from multiple images of the display of the display device 150 captured by a camera in communication with the factory device 110.

In some implementations, obtaining a representation of a two-dimensional graph of color-correction curves includes retrieving a compressed copy of the representation of the two-dimensional graph of color-correction curves from storage and decompressing the compressed copy of the representation of the two-dimensional graph of color-correction curves. For example, the SOC or DDIC may retrieve a compressed two-dimensional graph of color correction curves for the red sub-color from non-transitory memory storage of the display device 150, and then decompress the two-dimensional graph of color correction curves for the red sub-color.

The process 700 includes selecting a selected color-correction curve from among the color-correction curves based on both the second sub-color value and the third sub-color value (740). For example, the SOC or DDIC of display device 150 may select a blue sub-color correction curve based on a red sub-color value and green sub-color both being zero. In another example, the SOC or DDIC may select a different blue sub-color correction curve based on the red sub-color value and green sub-color value both being two hundred fifty five.

The process 700 includes determining a corrected first sub-color value for the particular pixel based on the first sub-color value (750). For example, the SOC or DDIC of display device 150 may determine the corrected blue sub-color value of fifty nine for the particular pixel based on the blue sub-color value of sixty.

In some implementations, determining a corrected first sub-color value for the particular pixel, from among the multiple corrected first sub-color values provided by the selected curve, based on the first sub-color value for the particular pixel includes selecting a selected position along the color-correction curve that was selected based on the first sub-color value for the particular pixel and identifying the corrected first sub-color value for the particular pixel based on the selected position, the corrected first sub-color value being different than the first sub-color value. For example, the SOC or DDIC of display device 150 may determine the corrected blue sub-color value of fifty nine for the particular pixel based on the blue sub-color value of sixty based on selecting a position along a curve where the x-axis value is sixty and identifying the y-axis value of the curve at that position is fifty nine.

The process 700 includes outputting the image using the corrected first sub-color value for the particular pixel instead of the first sub-color value (760). For example, the SOC or DDIC of the display device 150 may show the corrected red sub-color value of sixty one for the particular pixel instead of the red sub-color value of sixty.

In some implementations, the process 700 includes obtaining a second representation of a second two-dimensional graph of second color-correction curves, wherein each respective color-correction curve of the second color-correction curves in the second two-dimensional graph provides multiple corrected second sub-color values for multiple respective original second sub-color values, and corresponds to a combination of an second first sub-color value and an original third sub-color value that is unique to the respective color-correction curve and different from other color-correction curves in the two-dimensional graph. For example, the two-dimensional graph 220A of red sub-color correction curves may include a first curve 232A that shows corrected red-sub-color values for an original red sub-color value of zero as the original blue sub-color value changes along the x-axis.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or OLED (organic light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
   obtaining an image to be shown on a display;
   determining three sub-color values of a particular pixel in the image, including a first sub-color value for a first sub-color, a second sub-color value for a second sub-color, and a third sub-color value for a third sub-color of the particular pixel;

obtaining a representation of a first two-dimensional graph of color-correction curves, wherein each respective color-correction curve of the color-correction curves in the first two-dimensional graph:
(i) provides multiple corrected first sub-color values for multiple respective original first sub-color values, and
(ii) corresponds to a combination of an original second sub-color value and an original third sub-color value that is unique to the respective color-correction curve and different from other color-correction curves in the first two-dimensional graph;

selecting a selected first color-correction curve, from among the color-correction curves in the first two-dimensional graph of color-correction curves, to use to correct the first sub-color value for the particular pixel in the image, based on both the second sub-color value for the particular pixel in the image and the third sub-color value for the particular pixel in the image;

determining a corrected first sub-color value for the particular pixel, from among the multiple corrected first sub-color values provided by the selected first color-correction curve, based on the first sub-color value for the particular pixel;

obtaining a representation of a second two-dimensional graph of color-correction curves, wherein each respective color-correction curve of the color-correction curves in the second two-dimensional graph:
(i) provides multiple corrected second sub-color values for multiple respective original first sub-color values, and
(ii) corresponds to a combination of an original second sub-color value and an original third sub-color value that is unique to the respective color-correction curve and different from other color-correction curves in the second two-dimensional graph;

selecting a selected second color-correction curve, from among the color-correction curves in the second two-dimensional graph of color-correction curves, to use to correct the second sub-color value for the particular pixel in the image, based on both the second sub-color value for the particular pixel in the image and the third sub-color value for the particular pixel in the image;

determining a corrected second sub-color value for the particular pixel, from among the multiple corrected second sub-color values provided by the selected second color-correction curve, based on the first sub-color value for the particular pixel; and outputting the image using the corrected first sub-color value and the corrected second sub-color value for the particular pixel, instead of the first sub-color value and the second sub-color value.

2. The method of claim 1, wherein:
determining a corrected first sub-color value for the particular pixel, from among the multiple corrected first sub-color values provided by the selected first color-correction curve, based on the first sub-color value for the particular pixel comprises:
selecting a first selected position along the selected first color-correction curve based on the first sub-color value for the particular pixel; and
identifying the corrected first sub-color value for the particular pixel based on the first selected position, the corrected first sub-color value being different than the first sub-color value; and
determining a corrected second sub-color value for the particular pixel, from among the multiple corrected second sub-color values provided by the selected second color-correction curve, based on the first sub-color value for the particular pixel comprises:
selecting a second selected position along the selected second color-correction curve based on the first sub-color value for the particular pixel; and
identifying the corrected second sub-color value for the particular pixel based on the second selected position, the corrected second sub-color value being different than the second sub-color value.

3. The method of claim 1, wherein determining three sub-color values of a particular pixel in the image comprises:
determining red, green, and blue sub-colors.

4. The method of claim 1, wherein the representation of the two-dimensional graph of color-correction curves is generated from a three-dimensional graph, where three axes of the three-dimensional graph correspond to the three sub-colors.

5. The method of claim 4, wherein the three-dimensional graph was generated from multiple images of the display captured by a camera during a calibration process.

6. The method of claim 1, wherein obtaining a representation of a first two-dimensional graph of color-correction curves comprises:
retrieving a compressed copy of the representation of the first two-dimensional graph of color-correction curves from storage; and
decompressing the compressed copy of the representation of the first two-dimensional graph of color-correction curves.

7. The method of claim 1, comprising:
obtaining a representation of a third two-dimensional graph of color-correction curves, wherein each respective color-correction curve of the color-correction curves in the third two-dimensional graph:
(i) provides multiple corrected third sub-color values for multiple respective original first sub-color values, and
(ii) corresponds to a combination of an original second sub-color value and an original third sub-color value that is unique to the respective color-correction curve and different from other color-correction curves in the third two-dimensional graph;
selecting a selected third color-correction curve, from among the color-correction curves in the third two-dimensional graph of color-correction curves, to use to correct the third sub-color value for the particular pixel in the image, based on both the second sub-color value for the particular pixel in the image and the third sub-color value for the particular pixel in the image;
determining a corrected third sub-color value for the particular pixel, from among the multiple corrected third sub-color values provided by the selected third color-correction curve, based on the first sub-color value for the particular pixel.

8. A system that includes circuitry configured to perform operations of:
obtaining an image to be shown on a display;
determining three sub-color values of a particular pixel in the image, including a first sub-color value for a first sub-color, a second sub-color value for a second sub-color, and a third sub-color value for a third sub-color of the particular pixel;
obtaining a representation of a first two-dimensional graph of color-correction curves, wherein each respective color-correction curve of the color-correction curves in the first two-dimensional graph:

(i) provides multiple corrected first sub-color values for multiple respective original first sub-color values, and
(ii) corresponds to a combination of an original second sub-color value and an original third sub-color value that is unique to the respective color-correction curve and different from other color-correction curves in the first two-dimensional graph;

selecting a selected first color-correction curve, from among the color-correction curves in the first two-dimensional graph of color-correction curves, to use to correct the first sub-color value for the particular pixel in the image, based on both the second sub-color value for the particular pixel in the image and the third sub-color value for the particular pixel in the image;

determining a corrected first sub-color value for the particular pixel, from among the multiple corrected first sub-color values provided by the selected first color-correction curve, based on the first sub-color value for the particular pixel;

obtaining a representation of a second two-dimensional graph of color-correction curves, wherein each respective color-correction curve of the color-correction curves in the second two-dimensional graph:
(i) provides multiple corrected second sub-color values for multiple respective original first sub-color values, and
(ii) corresponds to a combination of an original second sub-color value and an original third sub-color value that is unique to the respective color-correction curve and different from other color-correction curves in the second two-dimensional graph;

selecting a selected second color-correction curve, from among the color-correction curves in the second two-dimensional graph of color-correction curves, to use to correct the second sub-color value for the particular pixel in the image, based on both the second sub-color value for the particular pixel in the image and the third sub-color value for the particular pixel in the image;

determining a corrected second sub-color value for the particular pixel, from among the multiple corrected second sub-color values provided by the selected second color-correction curve, based on the first sub-color value for the particular pixel; and outputting the image using the corrected first sub-color value and the corrected second sub-color value for the particular pixel,. instead of the first sub-color value and the second sub-color value.

9. The system of claim 8, wherein:
determining a corrected first sub-color value for the particular pixel, from among the multiple corrected first sub-color values provided by the selected first color-correction curve, based on the first sub-color value for the particular pixel comprises:
selecting a first selected position along the selected first color-correction curve based on the first sub-color value for the particular pixel; and
identifying the corrected first sub-color value for the particular pixel based on the first selected position, the corrected first sub-color value being different than the first sub-color value; and
determining a corrected second sub-color value for the particular pixel, from among the multiple corrected second sub-color values provided by the selected second color-correction curve, based on the first sub-color value for the particular pixel comprises:
selecting a second selected position along the selected second color-correction curve based on the first sub-color value for the particular pixel; and
identifying the corrected second sub-color value for the particular pixel based on the second selected position, the corrected second sub-color value being different than the second sub-color value.

10. The system of claim 8, wherein determining three sub-color values of a particular pixel in the image comprises:
determining red, green, and blue sub-colors.

11. The system of claim 8, wherein the representation of the two-dimensional graph of color-correction curves is generated from a three-dimensional graph, where three axes of the three-dimensional graph correspond to the three sub-colors.

12. The system of claim 11, wherein the three-dimensional graph wasi generated from multiple images of the display captured by a camera during a calibration process.

13. The system of claim 8, wherein obtaining a representation of a first two-dimensional graph of color-correction curves comprises:
retrieving a compressed copy of the representation of the first two-dimensional graph of color-correction curves from storage; and
decompressing the compressed copy of the representation of the first two-dimensional graph of color-correction curves.

14. The system of claim 8, comprising:
obtaining a representation of a third two-dimensional graph of color-correction curves, wherein each respective color-correction curve of the color-correction curves in the third two-dimensional graph:
(i) provides multiple corrected third sub-color values for multiple respective original first sub-color values, and
(ii) corresponds to a combination of an original second sub-color value and an original third sub-color value that is unique to the respective color-correction curve and different from other color-correction curves in the third two-dimensional graph;
selecting a selected third color-correction curve, from among the color-correction curves in the third two-dimensional graph of color-correction curves, to use to correct the third sub-color value for the particular pixel in the image, based on both the second sub-color value for the particular pixel in the image and the third sub-color value for the particular pixel in the image;
determining a corrected third sub-color value for the particular pixel, from among the multiple corrected third sub-color values provided by the selected third color-correction curve, based on the first sub-color value for the particular pixel.

15. A non-transitory computer-readable medium storing software comprising instructions executable by one or more computers which, upon such execution, cause the one or more computers to perform operations comprising:
obtaining an image to be shown on a display;
determining three sub-color values of a particular pixel in the image, including a first sub-color value for a first sub-color, a second sub-color value for a second sub-color, and a third sub-color value for a third sub-color of the particular pixel;
obtaining a representation of a first two-dimensional graph of color-correction curves, wherein each respective color-correction curve of the color-correction curves in the first two-dimensional graph:

(i) provides multiple corrected first sub-color values for multiple respective original first sub-color values, and
(ii) corresponds to a combination of an original second sub-color value and an original third sub-color value that is unique to the respective color-correction curve and different from other color-correction curves in the first two-dimensional graph;

selecting a selected first color-correction curve, from among the color-correction curves in the first two-dimensional graph of color-correction curves, to use to correct the first sub-color value for the particular pixel in the image, based on both the second sub-color value for the particular pixel in the image and the third sub-color value for the particular pixel in the image;

determining a corrected first sub-color value for the particular pixel, from among the multiple corrected first sub-color values provided by the selected first color-correction curve, based on the first sub-color value for the particular pixel;

obtaining a representation of a second two-dimensional graph of color-correction curves, wherein each respective color-correction curve of the color-correction curves in the second two-dimensional graph:
(i) provides multiple corrected second sub-color values for multiple respective original first sub-color values, and
(ii) corresponds to a combination of an original second sub-color value and an original third sub-color value that is unique to the respective color-correction curve and different from other color-correction curves in the second two-dimensional graph;

selecting a selected second color-correction curve, from among the color-correction curves in the second two-dimensional graph of color-correction curves, to use to correct the second sub-color value for the particular pixel in the image, based on both the second sub-color value for the particular pixel in the image and the third sub-color value for the particular pixel in the image;

determining a corrected second sub-color value for the particular pixel, from among the multiple corrected second sub-color values provided by the selected second color-correction curve, based on the first sub-color value for the particular pixel; and outputting the image using the corrected first sub-color value and the corrected second sub-color value for the particular pixel,. instead of the first sub-color value and the second sub-color value.

16. The medium of claim 15, wherein:
determining a corrected first sub-color value for the particular pixel, from among the multiple corrected first sub-color values provided by the selected first color-correction curve, based on the first sub-color value for the particular pixel comprises:
selecting a first selected position along the selected first color-correction curve based on the first sub-color value for the particular pixel; and
identifying the corrected first sub-color value for the particular pixel based on the first selected position, the corrected first sub-color value being different than the first sub-color value; and determining a corrected second sub-color value for the particular pixel, from among the multiple corrected second sub-color values provided by the selected second color-correction curve, based on the first sub-color value for the particular pixel comprises:
selecting a second selected position along the selected second color-correction curve based on the first sub-color value for the particular pixel; and
identifying the corrected second sub-color value for the particular pixel based on the second selected position, the corrected second sub-color value being different than the second sub-color value.

17. The medium of claim 15, wherein determining three sub-color values of a particular pixel in the image comprises:
determining red, green, and blue sub-colors.

18. The medium of claim 15, wherein the representation of the two-dimensional graph of color-correction curves is generated from a three-dimensional graph, where three axes of the three-dimensional graph correspond to the three sub-colors.

* * * * *